Feb. 14, 1933.   T. J. SCOFIELD   1,897,400
BRACKET FOR AUTOMOTIVE RADIO SETS
Filed Feb. 4, 1931   3 Sheets-Sheet 1

Feb. 14, 1933.     T. J. SCOFIELD     1,897,400
BRACKET FOR AUTOMOTIVE RADIO SETS
Filed Feb. 4, 1931     3 Sheets-Sheet 3

Inventor
Theodore J. Scofield
By her Attorney
Dray Adams

Patented Feb. 14, 1933

1,897,400

UNITED STATES PATENT OFFICE

THEODORE J. SCOFIELD, OF JACKSON, MICHIGAN, ASSIGNOR TO THE SPARKS-WITHINGTON CO., A CORPORATION OF OHIO

BRACKET FOR AUTOMOTIVE RADIO SETS

Application filed February 4, 1931. Serial No. 513,260.

This invention relates to brackets for radio sets mounted on automobiles, airplanes, boats and other automotive devices or other things to which a radio set is to be secured.

An object of the invention is to so construct the bracket that the radio set will be rigidly held in position and withstand the strains to which rough travel on an automotive device will subject it.

Another object is to arrange the parts so that the set can be lowered into accessible position without dismantling the bracket.

Other objects will appear in the appended description, reference being had to the drawings in which.

Without limiting the invention thereto, it is illustrated in connection with an automobile.

Figure 1:
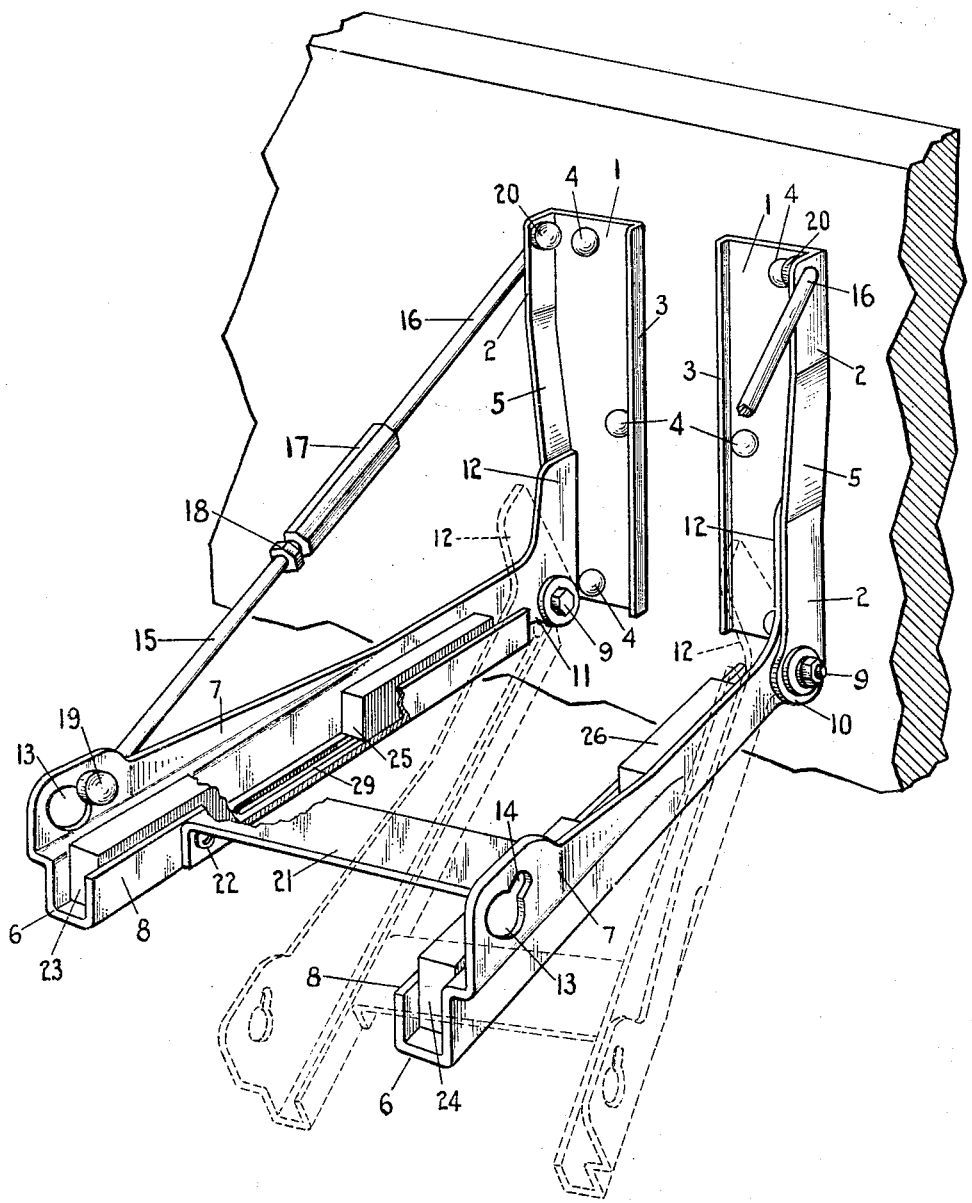
Fig. 1 is a perspective view of the bracket attached to the dash.

Referring to Fig. 1, two channel bars 1, each having one of the sides 2 deeper than the other one 3, is fastened by bolts 4 to the dash or other part of the automobile or other device. It is preferable to bolt these channel bars to the dash so that the radio set will be held directly under the instrument board as shown in Fig. 3. The two channel bars may be identical except that one is complementary to the other, that is, one is right hand in construction while the other is left hand. The upper part of the deeper side 2 is preferably curved outwardly at 5, as shown particularly in Fig. 2 to give proper clearance between the radio set and the head of the tie bolts later referred to.

Two complementary channel shaped bars 6 preferably having one side 7 deeper than the other side 8 are hinged by bolt 9 to the lower end of sides 2 of the channel bars 1. The sides 2 and 7 may have ears 10 and 11 through which holes are formed to receive the hinge bolts 9. The channels 6 have at the hinge end, right angle extensions 12 adapted to contact with the bottom of the channel 1 in operative position so that the upward movement of the channel bars 6 is definitely limited.

The outer ends of the sides 7 of the channel bars 6 have a hole 13 terminating in a slot 14. The channel bars 6 are held in operative position shown in full lines in Fig. 1 by two pairs of tie bolts 15, 16, and united together by turn buckle 17, threaded by right hand threads to one bolt and by left hand threads to the other. Lock nuts 18 hold the adjusted position of the turn buckle. The heads 19 may pass readily through the holes 13 and the hook ends of the rod may pass into slots 14 which are too small to pass the heads 19. The tie bolts 16 may be inserted through the holes in the upper ends of sides 2 and the large heads 20 are prevented from passing therethrough but the bolts may be readily inserted and removed when the turn buckle has been disconnected.

Figure 2:
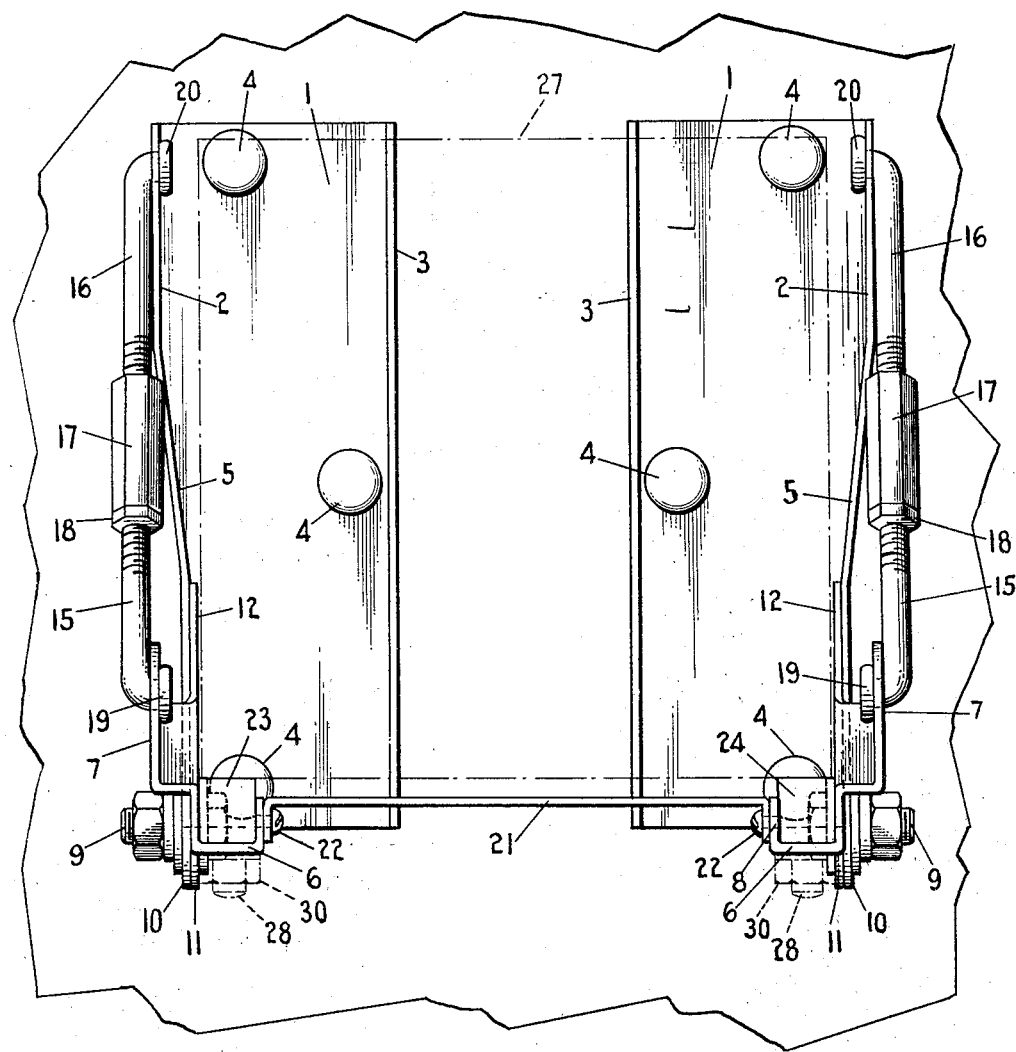
Fig. 2 is an end view of the bracket.
Figure 3:
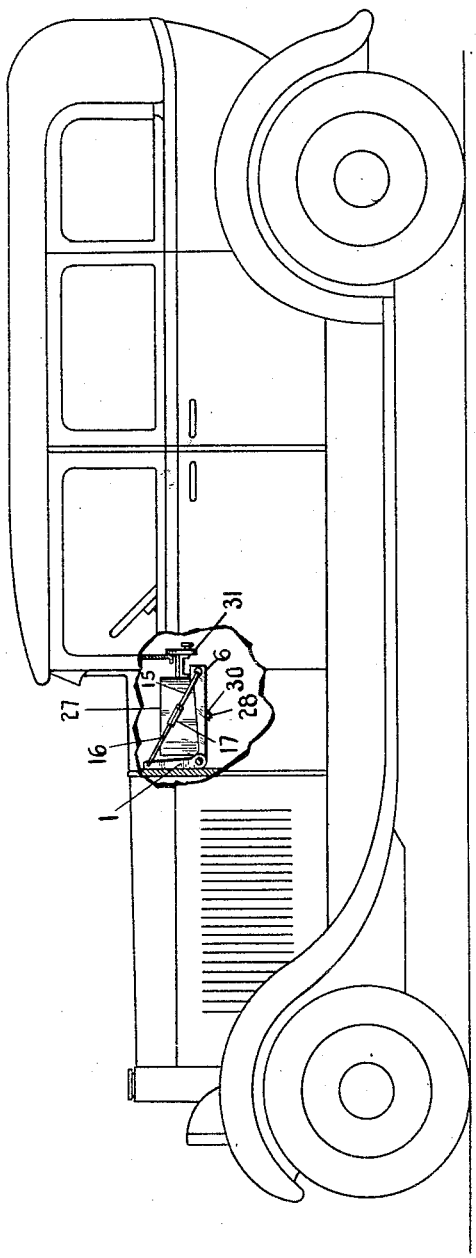
Fig. 3 is an elevation of the bracket and radio set installed in an automobile.

The sides 2 and 7 of the channel bars 1 and 6 have been curved outwardly, as shown in Fig. 2, so that the channel is wider at the top than at the bottom. This provides extra space for the heads 20 of the tie bolts 16 so they will clear the sides of the radio set when it is placed in the bracket. The sides 7 are likewise pressed outward to provide clearance for the heads 19 of the tie bolts 15.

A cross tie 21 is secured by screws 22 or other appropriate fastening to the channel bars 6.

To cushion vibrations and shock to which the radio set will be subjected, rubber blocks 23, 24, 25 and 26 are placed in the troughs of channel bars 6.

To place the radio set in the bracket, the lock nuts 18 and turn buckles 17 will be loosened until the heads 19 of the bolts 15 are in the openings 13. The tie bolts can then be moved outwardly until the heads 19 disengage the holes 13. The base portion of the bracket can then be lowered as indicated in dotted lines in Fig. 1. The radio set 27 can then be slid into place with the bottom resting on the rubber blocks. The base can then be raised and the heads 19 of the tie bolts 15 reinserted into holes 13. The necks of the bolts will then slide into slots 14. On tightening the turn buckles and lock nuts the bracket can be raised into locked position with the extension 12 sealed against the bottom of the channel bars 1.

A pair of bolts 28 extend through slots 29 in the bars 6 and nuts 30 thereon with suitable lock washers clamp the set firmly in place.

The slots 29 permit one to slide the radio set outwardly or inwardly to the correct position with the control board 31 in the desired position.

Having described my invention, what I claim is:

1. In supports for radio sets, a pair of channel bars each having one side flange extending above the other side flange, clamping plates hinged at one of their ends to one of the ends of said channel bars, tie rods connected at one of their ends to said sides of the channel bars and at their other ends to the other ends of the clamping plates, cushioning blocks in said channel bars extending slightly above the shorter side thereof.

2. In supports for radio sets, a pair of channel bars, each having one side flange extending above the other side flange, the extending side being offset near the end thereof and having holes therethrough, clamping plates hinged at one of their ends to one of the ends of said channel bars, tie rods having ends extending through said holes and their other ends secured to said clamping plates.

3. In supports for radio sets, a pair of channel bars, a pair of clamping plates hinged at their lower ends to ends of said bars, tie rods connected to said bars and to said plates, one of the sides of said channel bars being extended to form limit stops to prevent the bars from moving around said hinges beyond a predetermined angle, and means to shorten said tie rods to move the bars about the hinge until said limit stops abut against said plates.

4. In supports for radio sets, a pair of angle bars, a second pair of angle bars having one of their sides hinged to one of the sides of the first mentioned angle bars, and projections on the sides of one of the angle bars adapted to prevent the bars from relative movement around the hinges beyond a predetermined angle, tie rods connected across the free ends of said bars, and means to shorten said tie rods to move the bars about the hinges until said projections engage the other angle bar.

5. In supports for radio sets, a pair of channel bars, a second pair of channel bars, the sides of one pair of channel bars being hinged to the sides of the other channel bars, tie rods connected across the free ends of the channel bars, projections from one side of one pair of channel bars adapted to engage the other pair of channel bars, and means to shorten said tie rods to move said bars about the hinge until said projections engage the channel bars as aforesaid.

In testimony whereof, I have signed my name to this specification this 26th day of January 1931.

THEODORE J. SCOFIELD.